(12) United States Patent
Levy et al.

(10) Patent No.: US 9,565,120 B2
(45) Date of Patent: Feb. 7, 2017

(54) METHOD AND SYSTEM FOR PERFORMING DISTRIBUTED DEEP-PACKET INSPECTION

(75) Inventors: Yoav Levy, Givat-Shapira (IL); David Ivancovsky, Maccabim (IL); Doron Tal, Kfar Shmaryahu (IL); Gal Sitton, Netanya (IL); Asaf Koren, Netanya (IL)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/361,169

(22) Filed: Jan. 30, 2012

(65) Prior Publication Data

US 2013/0195457 A1     Aug. 1, 2013

(51) Int. Cl.
*H04L 12/841*     (2013.01)
*H04L 12/853*     (2013.01)
*H04L 29/06*      (2006.01)

(52) U.S. Cl.
CPC ......... *H04L 47/283* (2013.01); *H04L 47/2416* (2013.01); *H04L 63/0245* (2013.01); *H04L 63/1416* (2013.01)

(58) Field of Classification Search
CPC ............... H04L 47/283; H04L 63/0245; H04L 63/1416; H04L 47/2416
See application file for complete search history.

(56) References Cited

U.S. PATENT DOCUMENTS

| | | | |
|---|---|---|---|
| 7,643,753 B2 | 1/2010 | Weitz et al. | |
| 7,801,161 B2 | 9/2010 | Levy et al. | |
| 8,339,959 B1 | 12/2012 | Moisand et al. | |
| 2002/0087732 A1 | 7/2002 | Boucher et al. | |
| 2003/0198189 A1 | 10/2003 | Roberts et al. | |
| 2004/0042456 A1 | 3/2004 | Dittmann et al. | |
| 2006/0114832 A1 | 6/2006 | Hamilton et al. | |
| 2006/0233101 A1 | 10/2006 | Luft et al. | |
| 2007/0067497 A1 | 3/2007 | Craft et al. | |
| 2007/0070997 A1* | 3/2007 | Weitz et al. | 370/389 |
| 2007/0121653 A1* | 5/2007 | Reckamp | H04L 12/2803 370/401 |
| 2008/0002579 A1 | 1/2008 | Lindholm et al. | |
| 2009/0073884 A1 | 3/2009 | Kodama et al. | |

(Continued)

OTHER PUBLICATIONS

U.S. Appl. No. 13/715,372, filed Dec. 14, 2012, entitled "Selective Deep Packet Inspection".

(Continued)

*Primary Examiner* — Walter Divito
(74) *Attorney, Agent, or Firm* — Sterne, Kessler, Goldstein & Fox PLLC

(57) ABSTRACT

A method for deep-packet inspection of packets flowing through an end unit in a point-to-multipoint network. The method comprises classifying packet flows through the end unit using their flow-identification (ID) to determine which of the packet flows should be deep-packet inspected, wherein the packet flows include incoming packets received from a central unit and outgoing packets sent to the central unit of the point-to-multipoint network; duplicating packets determined to be deep-packet inspected; saving all duplicated packets in a memory; upon collection of a predefined number of duplicated packets belonging to a certain flow-ID, performing deep-packet processing based on at least one deep-packet inspection application; and saving the deep-packet processing results in the memory.

25 Claims, 5 Drawing Sheets

(56) References Cited

U.S. PATENT DOCUMENTS

| | | |
|---|---|---|
| 2009/0074411 A1 | 3/2009 | Bernard et al. |
| 2009/0300153 A1* | 12/2009 | Ray et al. .................... 709/223 |
| 2009/0323536 A1 | 12/2009 | Liu et al. |
| 2010/0054231 A1* | 3/2010 | Dolganow et al. .......... 370/349 |
| 2010/0132031 A1 | 5/2010 | Zheng |
| 2010/0208590 A1* | 8/2010 | Dolganow et al. .......... 370/235 |
| 2010/0235522 A1 | 9/2010 | Chen et al. |
| 2011/0060851 A1 | 3/2011 | Monchiero et al. |
| 2011/0085571 A1 | 4/2011 | Chandrachood |
| 2011/0145902 A1 | 6/2011 | Kim et al. |
| 2012/0069749 A1* | 3/2012 | Famolari et al. ............. 370/252 |
| 2013/0083806 A1* | 4/2013 | Suarez Fuentes et al. ... 370/465 |
| 2013/0086279 A1 | 4/2013 | Archer et al. |
| 2013/0329584 A1 | 12/2013 | Ghose et al. |
| 2014/0052836 A1 | 2/2014 | Nguyen et al. |
| 2014/0059155 A1 | 2/2014 | Boucher et al. |
| 2014/0169367 A1 | 6/2014 | Tsym |

OTHER PUBLICATIONS

*Data-Over-Cable Service Interface Specifications, DOCSIS 3.0, MAC and Upper Layer Protocols Interface Specification*, CM-SP-MULPIv3.0-I16-110623, 768 pages, Copyright 2006-2011 Cable Television Laboratories, Inc.

\* cited by examiner

METHOD AND SYSTEM FOR PERFORMING DISTRIBUTED DEEP-PACKET INSPECTION

TECHNICAL FIELD

The present invention generally relates to processing of network traffic, and more particularly to performing deep packet inspection of data traffic in point-to-multipoint networks.

BACKGROUND OF THE INVENTION

Deep packet inspection (DPI) is a technique of a network packet filtering that examines the payload and in some cases header of a packet, when the packet reaches an inspection module. The DPI technique has many applications including, for example, advanced network management services, security (e.g., malware and spam detection), data mining, eavesdropping, censorship, and the like. The packet inspection can be performed from Layer 2 through Layer 7 of the open system interconnection model (OSI) model. This includes inspection of one or more of headers, data protocol structures, and payload of the message. The layer or layers and the content within a packet being inspected depend on the application. As an example, for a data mining or eavesdropping application, the DPI may include searching for keywords in packets carrying layer 7 protocols' data. Examples for such protocols include hypertext transfer protocol (HTT), simple mail transfer protocol, instant-messaging protocols, and the like.

In conventional communication systems, the packets, filtering, classification, and inspection is performed by DPI systems. In point-to-multipoint networks, DPI systems are typically deployed near to a central node (e.g., line terminal node, switchboard, data center, etc.) or as a proxy between user nodes and the central node. This requires the DPI system to receive all traffic flows between all user nodes and the central node, process the traffic, and relay the inspected traffic by the DPI system back to the network.

Examples for possible deployments of a DPI system are illustrated in FIG. 1 where a point-to-multipoint network 100 is shown. The system 100 includes M end-units 120-1 through 120-M (collectively end units 120) connected to a central unit 130 via a network 140. The network 140 facilitates the communication between the end-units 120 and the central unit 130. The network 140 may be realized as multiple optical connections between the end-units 120 and the central unit 130. Thus, exemplary network 100 may be a passive optical network (PON).

In the network 100, a DPI system 150 is connected to the central unit 130. The DPI system 150 taps traffic flows between the end-units 120 and the OLT 130 and processes such traffic, in real-time, for deep-pack inspection purposes, e.g., to identify information of interest to a user of the DPI system 150.

Regardless of the deployment of the DPI system, the operation of such system, specifically those designed for data mining, eavesdropping, and censorship applications, is intrusive. That is, a packet sent from an end-unit 120 is inspected by the DPI system 150. With this aim, the packet is first terminated by the central unit 130 and then mirrored to the DPI system 150. As a result, the communication latency between the central unit 130 and end-units 120 is significant.

Furthermore, the DPI system (e.g., system 150) should process all packets flowing from all end-units 120 to central node 130, thus the DPI system should handle vast amount of data. Thus, a conventional DPI system is typically a complex processing machine that should have powerful processing capabilities. Hence, conventional DPI systems are also costly.

Other techniques for tapping users' traffic include an Ethernet hub connected to an end-unit that replicates Ethernet frames. The duplicated Ethernet frames are forwarded to a DPI system for further processing. Such solutions replicate all Ethernet frames, thus still require utilizing DPI systems having powerful processing capabilities. Further, inspection of frames are limited to Layer 2 inspection, hence information encapsulated in higher layers cannot be evaluated.

Therefore, it would be highly advantageous to provide a DPI solution that overcomes the deficiencies noted above.

SUMMARY OF THE INVENTION

Certain embodiments disclosed herein include a method for deep-packet inspection of packets flowing through an end unit in a point-to-multipoint network. The method comprises classifying packet flows through the end unit using their flow-identification (ID) to determine which of the packet flows should be deep-packet inspected, wherein the packet flows include incoming packets received from a central unit and outgoing packets sent to the central unit of the point-to-multipoint network; duplicating packets determined to be deep-packet inspected; saving all duplicated packets in a memory; upon collection of a predefined number of duplicated packets belonging to a certain flow-ID, performing deep-packet processing based on at least one deep-packet inspection application; and saving the deep-packet processing results in the memory.

Certain embodiments disclosed herein also include a processing system integrated in an end-unit of a point-to-multipoint network and performing deep-packet inspection of packets flowing through the end unit. The processing system comprises a packet processor for classifying packet flows through the end unit using their flow-identification (ID) to determine which of the packet flows should be deep-packet inspected, wherein the packet processor further duplicates packets determined to be deep-packet inspected; and a first microprocessor for performing deep-packet processing based on at least one deep-packet inspection application, wherein the deep-packet processing is performed upon collection of predefined number of duplicated packets belonging to a certain flow-ID determined to require such processing.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE INVENTION

Figure 1:
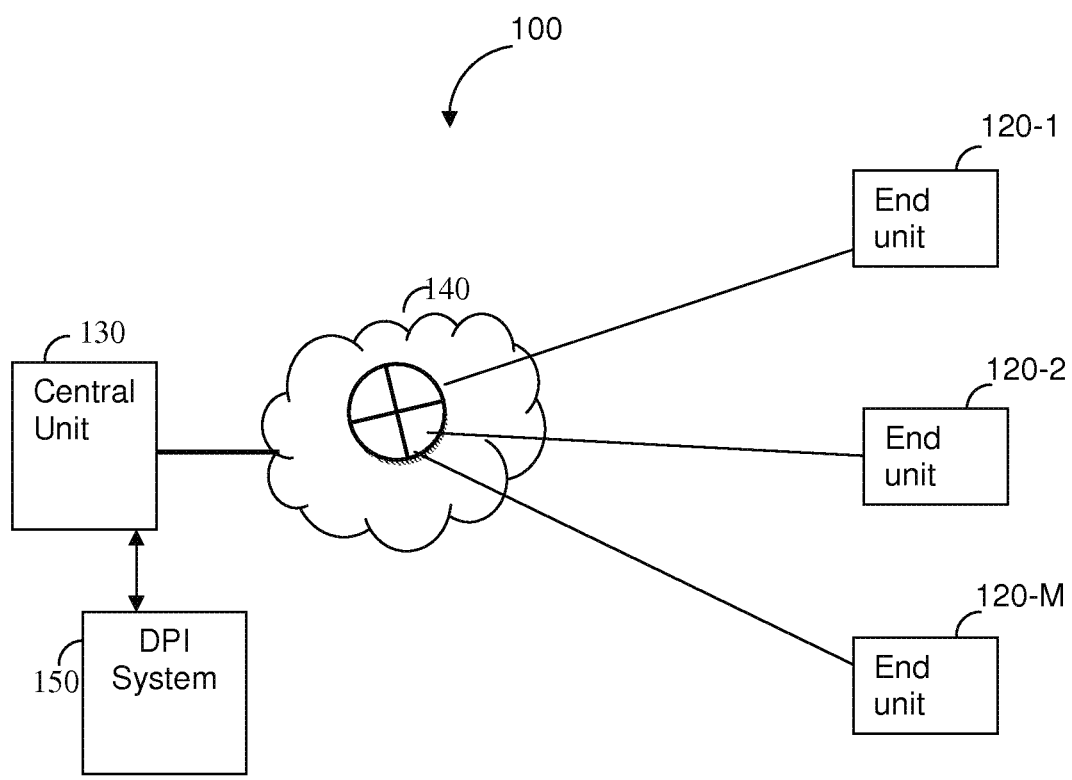
FIG. 1 is a diagram of a point-to-multiple network.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Figure 2:
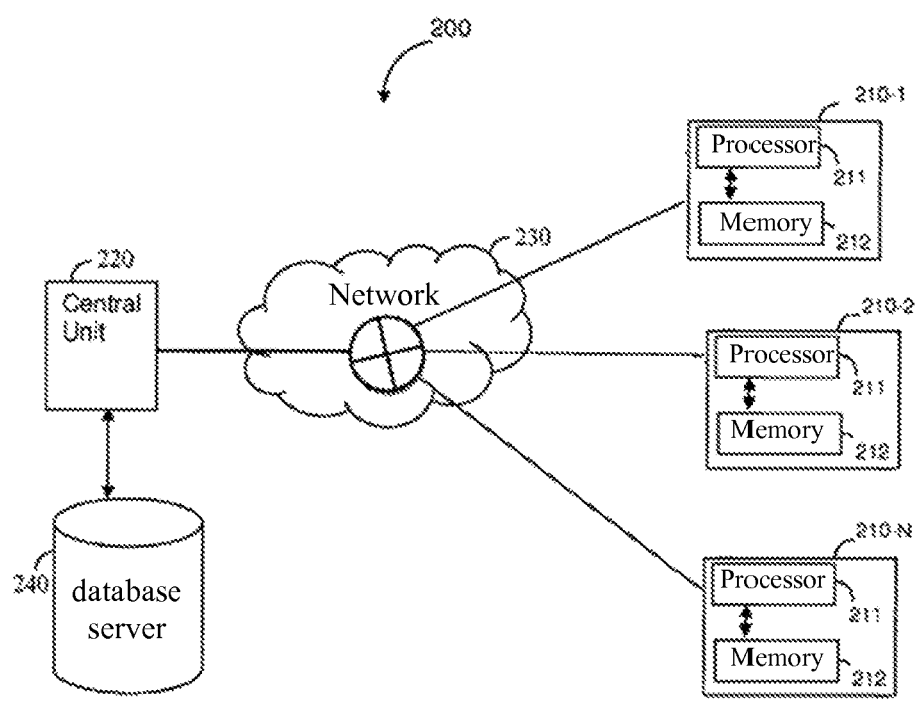
FIG. 2 is a diagram of a point-to-multiple network utilized to describe various embodiments of the invention.

FIG. 2 shows a schematic diagram of a point-to-multipoint network 200 utilized to describe the various embodiments of a distributed deep-packet inspection (DPI) solution disclosed herein. The distributed DPI allows collection of users' traffic and inspection of such traffic in a non-intrusive manner, thus such tasks are performed without delaying the traffic flows between end-units and a central unit.

The point-to-multipoint network 200 includes M end-units 210-1 through 210-N (collectively referred to as end-units 210) connected to a central unit 220 via a network 230, and a database server 240. In an embodiment of the invention, the network 200 is a passive optical network (PON) where the end-units 210 are optical network units (ONUs) and the central unit 220 is an optical line terminal (OLT), the connection between ONUs and OLT is through an optical splitter.

In an embodiment, each end-unit acting as an ONU may include or be connected to a PON residential gateway that supports a bundle of high speed data services including voice, data, and video services. Such residential gateway and hence an end-unit may be connected to a computer via a local area network (LAN) or wireless LAN (WLAN), a set-box to provide IPTV content, a telephone, etc. One example for a PON residential gateway can be found in U.S. Pat. No. 7,801,161, assigned to the common assignee and incorporated herein by reference for the useful information it contains.

The database server 240 may be a computing machine that includes reliable storage medium. The database server 240 may be part of a data center designed to store inspected information and/or information extract as a result of the inspection of users' traffic. In an embodiment, the database server 240 is connected to the OLT.

According to an embodiment, a distributed DPI is achieved by spreading out the DPI tasks, conventionally performed by complex and powerful DPI systems, to the end-units 210. With this aim, an end-unit 210 includes a processor 211 and a memory 212. The processor 211 is programmed to perform deep-packet inspection of only packets belonging to a certain flow-ID and pass through the specific end-unit 210. For example, the processor 211 of end-unit 210-1 inspects only packets flowing through end-unit 210-1. The processor 211 may be a central processing unit (CPU), a network processor, a dedicated DPI processor, and the like. The memory 212 may be any form of non-transitory computer readable medium that server a program memory, a context memory, and a data memory. The memory 212 includes at least executable code design for packet inspection. Such code may be a high-level programming language (e.g., C) executed over an operation system.

In an embodiment, each processor 211 performs a DPI process optimized to monitor the traffic flows, filter and duplicate only packets related to certain flows that contain information of interest, and deep-packet inspection of such packets. Packet filtering and duplicating may be performed in real-time at the traffic rate, thereby reducing or eliminating any jitter or delay being inserted. The duplicated packets are inspected off-line while original packets continue the standard flow, thus packets are not placed "on-hold" until the processing is completed. The inspection results are sent to the database server 240. The duplicated packets are temporarily saved in the memory 212 and are not relayed back to the networked, once their DPI processing is completed. As a result, in contrast to existing solutions, there is no need to implement a complex mechanism to maintain the order of packets being tapped. The DPI process is described in further detail below.

It should be appreciated that as filtering, classification, collection and inspection of packets is performed independently by end-unit 210, the utilization of powerful, complex and expensive DPI systems is obviated. As each end-unit 210 processes only packets that it transmits or receives, the DPI process can be performed by means of a processor of the end-units 211 having a standard computing power. Further, as time-consuming tasks of packets collection and inspection are performed "off-line" independently by each end-unit 210, there is no added latency in the communication between an end-unit 210 and a central unit 230.

According to one embodiment, the distributed DPI process is centrally managed by a DPI management engine. The DPI management engine is connected directly to the central unit 220 or integrated therein. The DPI management engine performs the tasks including, by not limited to, managing the deep-packet inspection performed by the processors 211, providing each of the processors 211 with a DPI policy, and collecting events/statistics from the processors. As will be discussed below, the DPI policy defines, for example, which of the voice, data, and/or video services, communication protocols, users' devices, should be inspected by a processor 211.

Figure 3:
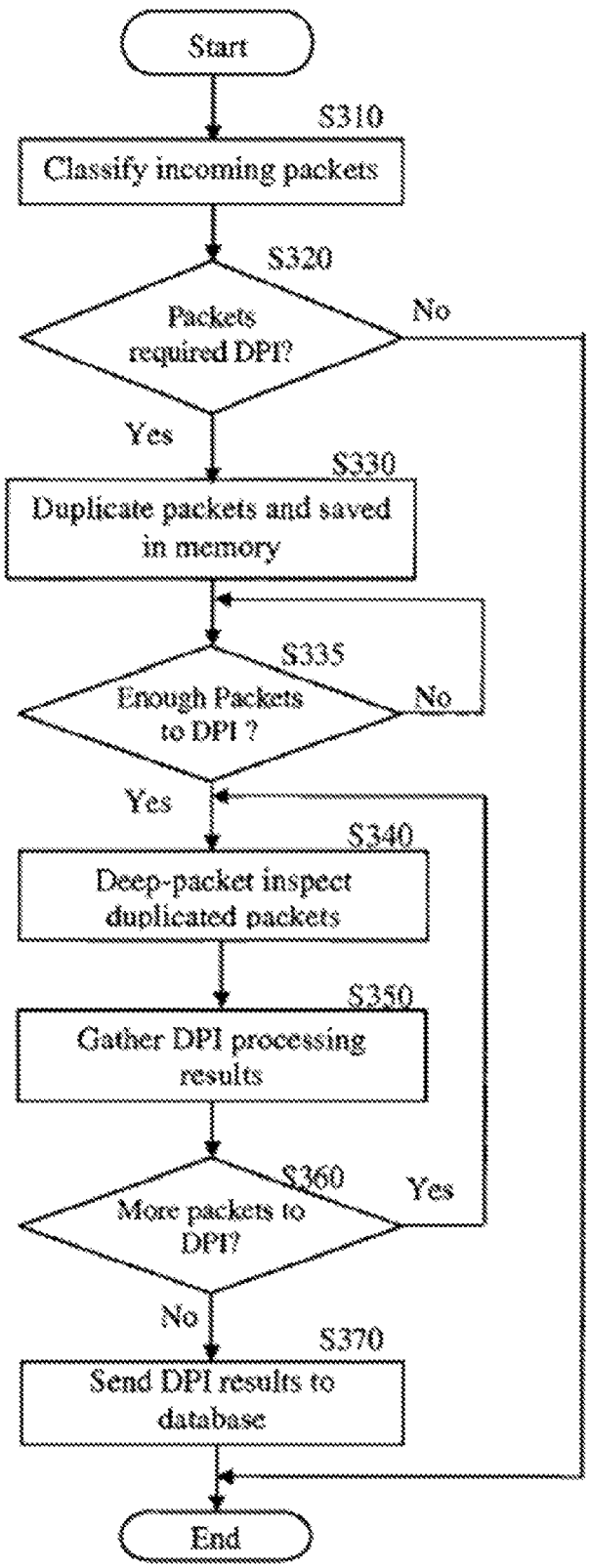
FIG. 3 is a flowchart illustrating a method for distributed DPI processing according to one embodiment.

FIG. 3 shows an exemplary and non-limiting flow-chart 300 describing a DPI process according to an embodiment of the invention. As noted above the DPI process is performed independently by a processor 211 in each end-unit 210 to process packets flow through the end-unit, thus the plurality of end-units perform the distributed deep-packet processing.

At S310, an incoming packet (i.e., packet sent from the central unit 220) or an outgoing packet (i.e., packet sent to the central unit 220) is parsed and classified to determine the flow-identification (ID) of the packet. At S320, it is checked if the flow-ID is designated in a flow table as requiring deep-packet inspection. In an embodiment of the invention, it is possible to determine which of the voice, data, and/or video services, communication protocols, users' devices (e.g., computers, handled devices, etc.), should be inspected. This can be achieved by configuring the flow table to designate which packets, based on their flow-IDs, need to be inspected.

For example, the flow table may be configured such that packets related to IPTV service should not be inspected. As another example, packets of HTTP and instant-messaging protocol should be inspected, while other layer-7 protocols related packets should be ignored. Yet in another example, only packets received from specific computing devices, identified by their MAC addresses, over the LAN or WLAN should be processed.

In an embodiment of the invention, the flow table resides in the memory 212. The flow table may be pre-configured according to the requirements of a customer requesting the DPI services. Such a customer may be, for example, a network operator, a regulation institution, a commercial organization, or any organization that legally can access data collected on users of the end units 210.

If S320 results with a Yes answer, execution continues with S330; otherwise, processing of packets associated with current flow-ID ends and operation continues as usual. At S330, the current packet and all subsequent packets having the same flow-ID are duplicated and saved in a memory. Once duplicated the packets are instantly forwarded to their destination. It should be noted that in one embodiment the duplication of packets is performed in real-time without inserting any delays.

At S335, it is checked if all packets, or a predefined number of packets, belonging to the flow-ID identified at S310 are saved in the memory. If so, execution continues with S340; otherwise, execution waits at S335 until the condition is satisfied.

At S340 the duplicated packets are deep-packet inspected. The procedure carried out at S340 depends on a DPI application requested by the customer. The DPI application may include, for example, advanced network management services (e.g., billing services, parental control, blocking internet access, etc.), security application (e.g., detection of malicious traffic) data mining, eavesdropping, censorship, and the like. As a non-limiting example, the duplicated packets can be analyzed to find keywords which appear in the packets carrying layer-7 protocols data. The analysis may be performed on the header and/or payload portions of the packets. For instance, such packets can be inspected to detect web-sites that a user(s) of an end-unit 210 visited, words that may hint on the user's intentions (e.g., parsing data posted on social media web sites, such as Facebook®, Twitter®, etc.). As another example, TCP packets can be analyzed to detect signatures or patterns of viruses, worms, malwares intend to harm devices connected to the end-unit 210 and/or the central unit 220. Yet in another example, at S340 all packets related to a certain flow-ID and received from a certain MAC address may be gathered. Other examples for performing deep-packet inspection on the duplicated packets will be apparent to one of ordinary skill.

As will be demonstrated below, a processor of an end-unit 210 may be programmed to perform the DPI application or applications requested by the customer. It should be noted that as the end-units 210 process packets independently of each other, different end-units 210 may be programmed to perform different DPI applications.

At S350, results of the packets inspection are collected and saved in a memory. The results may be arranged in a file or a data structure recognizable by the database server 240. At S360, it is checked if all packets related to the flow-ID identified as S310 are inspected, and if execution continues with S370 where the collected inspection results are provided to the database server 240; otherwise, execution returns to S340. It should be noted that deep-inspection results are sent to or downloaded by the database server 240 based one or more predefined conditions. For example, such conditions may be every fixed time interval (e.g., 2 hours), once a day, in specific dates, etc. Other conditions may be related to the content of the results, e.g., once a file size including the results reaches a predefined threshold, when certain keywords have been identified, and so on. In other embodiment, an alert can be sent to the customer, once the deep-inspection results are ready.

The inspection results saved in the database server 240 may be further processed for the purpose of the customer requested the DPI. For example, the processing may be for the purpose of monitoring communication and on-line activities performed by users of the end-units 210, providing targeted advertisements to users, blocking malicious attacks, blocking access to certain ISPs or web sites, and so on.

Figure 4:
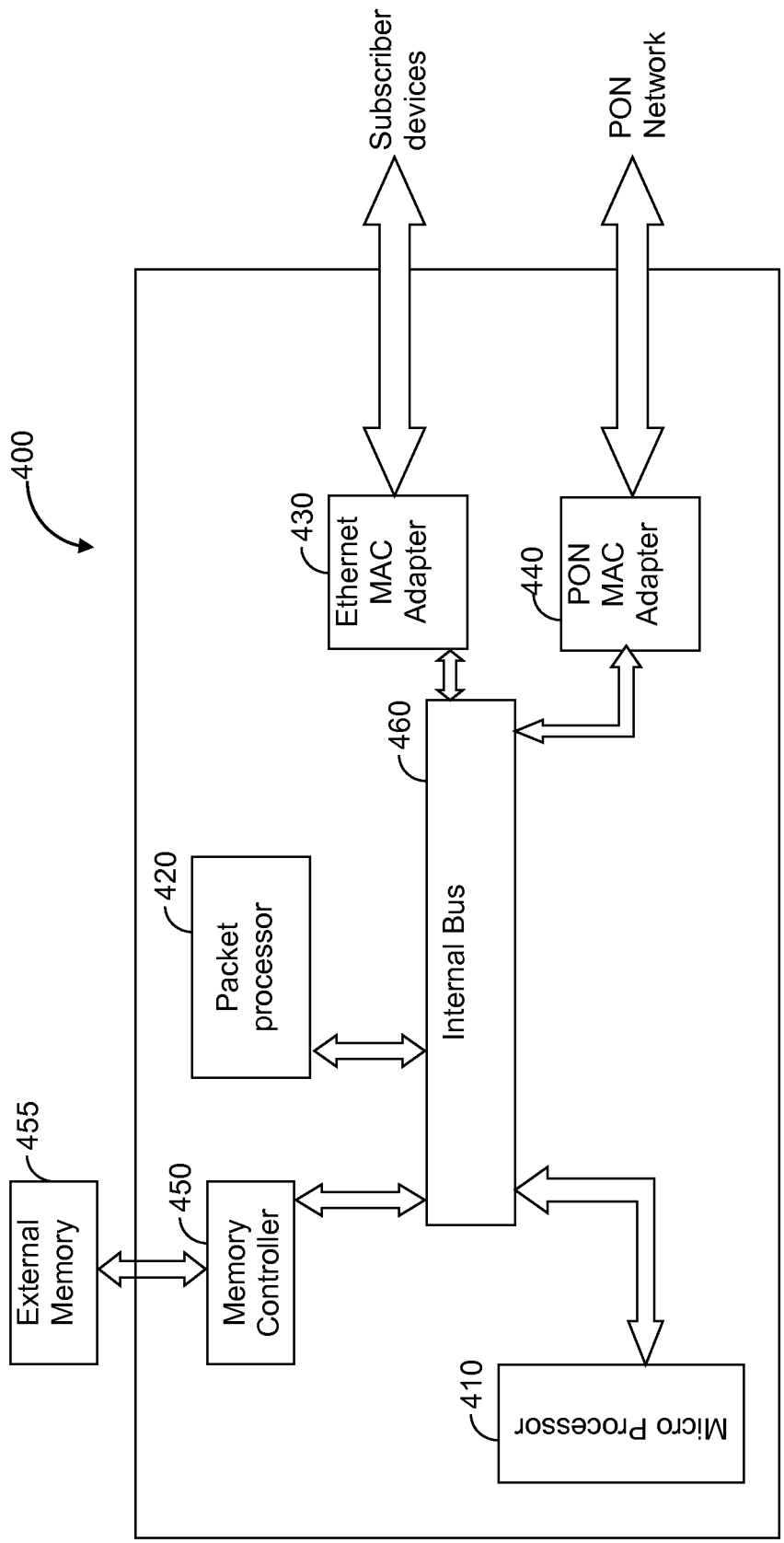
FIG. 4 is a schematic diagram of a PON processor adapted to perform the distributed DPI processing according to one embodiment.

FIG. 4 shows an exemplary block diagram of a PON processor 400 adapted to perform the DPI processing according to one embodiment disclosed herein. The PON processor 400 operates in an ONU and acts as an end-unit 210. The PON processor 400 includes a microprocessor 410, a packet processor 420, an Ethernet media access control (MAC) adapter 430, a PON MAC adapter 440, and a memory controller 450 that interacts with an external memory 455. The various components of the PON processor 400 communicate through an internal bus 460. The various components of the PON processor 400 and its architecture are described in U.S. Pat. No. 7,643,753 assigned in common to the same assignee as the present application, and is hereby incorporated for the useful information that it contains.

Traffic from/to an OLT acting as a central unit 220 is processed by the packet processor 420. This includes parsing, classifying, filtering, encrypting, and routing/bridging of packets. According to one embodiment, the packet processor 240 further determines if the packets should be deep inspected and duplicates packets belonging to flows designated as required DPI processing. The duplicated packets are saved in the external memory 455. Data processed by the packet processor 420 may be either an upstream flow or a downstream flow. The packet processor 420 may be a dedicated piece of hardware designed to accelerate the processing of packets belonging to a certain flow.

The microprocessor 410 executes tasks that are typically related to management of connections handled by the PON processor 400. For example, such tasks include, but are not limited to, open/close connections, control the state of a connection, identifying traffic received on a new connection, and so on. According to one embodiment, the microprocessor 410 is configured to deep inspect the duplicated packets saved in the memory 455 according to a DPI application or applications programmed by the customer of the DPI service. Examples for such DPI applications are provided above.

In an embodiment, the packet processor 420 provides the microprocessor 410 with packet information including, for example, a flow-ID, a MAC address, an IP address, and a port number that can also be indexed to the external memory for retrieving the packet. The microprocessor 410 uses this information to retrieve packets from a memory. The inspection results generated by the microprocessor 410 are saved in the external memory 455.

In an embodiment, the microprocessor 410 is a general-purpose CPU programmable to execute the DPI application. For example, the microprocessor 410 may be a MIPS 74KEC RISC microprocessor. Typically, a microprocessor 410 includes internal memory (not shown) that may consist of a program memory to keep the software and the operating system, a data memory to hold data of the various tasks, and a context memory to maintain instances of registers.

The architecture of the PON processor 400 provides great flexibility in performing DPI application and modifying such application as determined by the customer of the DPI service. That is, software code containing instructions to perform the DPI application, executed by the microprocessor 410, is coded using a high-level programming language (e.g., C). Thus, the application can be easily modified by a novice programmer by, for example, uploading the new software to an internal program memory of the microprocessor 410.

Figure 5:
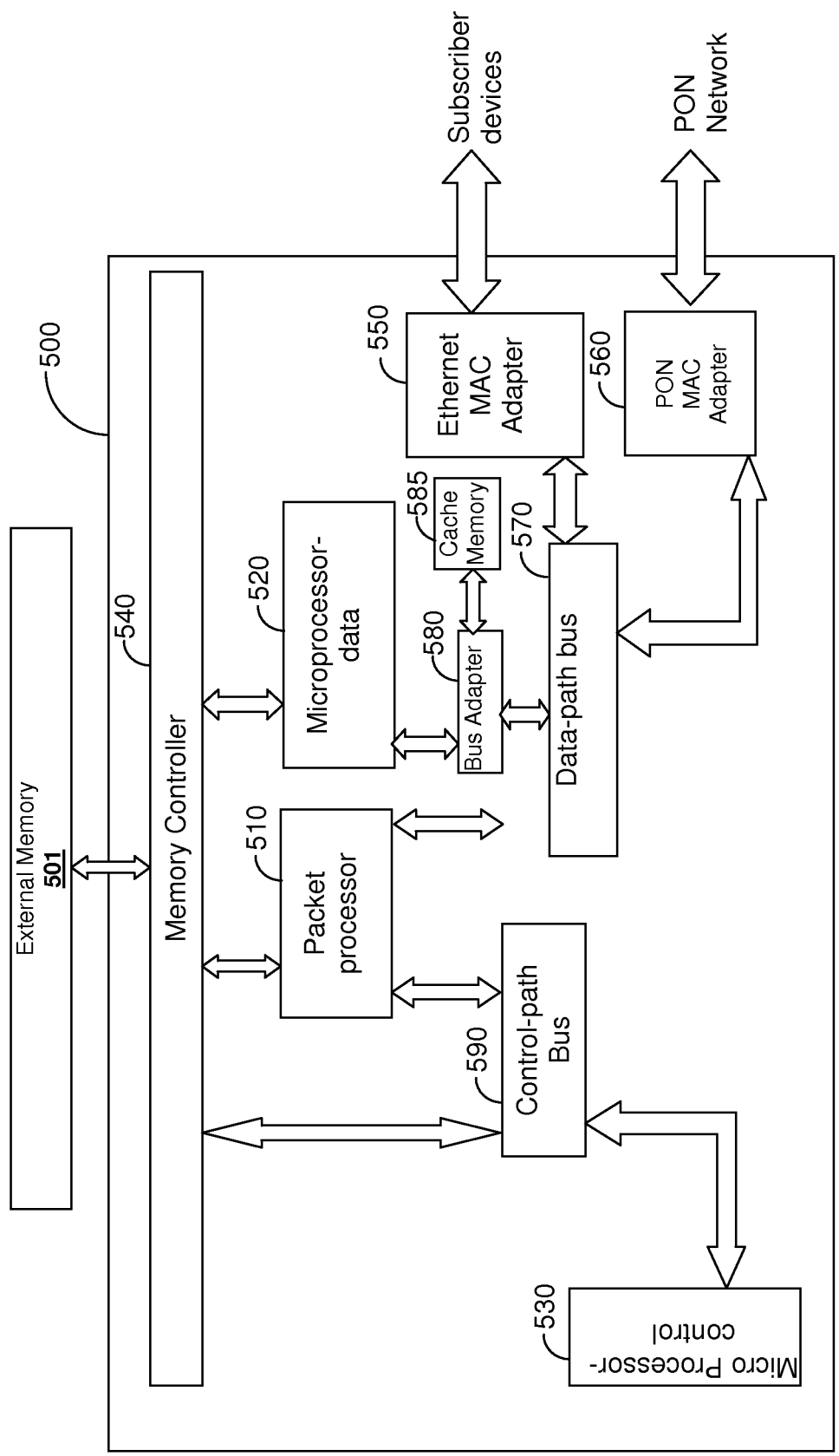
FIG. 5 is a block diagram of a PON processor adapted to perform the distributed DPI processing according to another embodiment.

FIG. 5 shows an exemplary and non-limiting block diagram of a PON processor 500 adapted to perform the DPI processing in accordance with another embodiment of the invention. The PON processor 500 includes a packet processor 510, a first microprocessor (hereinafter microprocessor-data) 520, a second microprocessor (hereinafter microprocessor-control) 530, a memory controller 540 that interacts with an external memory, an Ethernet MAC adapter 550, and a PON MAC adapter 560. The packet processor 510 communicates with the microprocessor-data 520, Ethernet MAC adapter 550, and PON MAC adapter 560 through a data-path bus 570. The microprocessor-data 520 interfaces with a data path bus using a bus adapter 580 that utilizes a cache memory 585. The packet processor 510, microprocessor-data 520, and memory controller 540 are connected through a control-path bus 590. In certain configurations, the PON processor 500 may include an array of packet processors 510. The various components of the PON processor 500 and its architecture are described in U.S. patent application Ser. No. 12/821,931 assigned in common to the same assignee as the present application, and is hereby incorporated for the useful information that it contains.

Each of the microprocessor-data 520 and microprocessor-control 530 includes internal memory (not shown) that may consist of a program memory to keep the software and the operating system, a data memory to hold data of the various tasks, and a context memory to maintain instances of registers. When updating the software of, for example, the microprocessor-data 520 the new software is uploaded to its internal program memory. In a similar fashion, the packet processor 510 also includes an internal memory (not shown) that consists of a program memory, a context memory, and a data memory. The firmware of the packet processor 510 is saved in the program memory.

According to an embodiment of the invention, the microprocessor-data 520 operates together with the packet processor 510 to perform deep inspection of packets belonging to a certain flow. Specifically, the packet processor 510 classifies packets according to their flow-ID, and packets that should be deep inspected are duplicated and written to an external memory 501 through the memory controller 540. In one embodiment, the duplicated packets belonging to a designated flow can be transferred on the data-path bus 570 to the microprocessor-data 520. In another embodiment, packets can be read and written to the external memory through the memory controller 540. In order to accelerate the packet processing, the microprocessor-data 520 can use data cached in the memory 585.

The microprocessor-data 520 performs the deep packet inspection on the duplicated packets according to the DPI application programmed by the user. The inspection results are saved in the external memory and later are sent to database server 240 through the MAC PON adapter.

The software code including instructions to perform the DPI application is uploaded and maintained in the internal memory program of the microprocessor-data 520. The certain flows (by their flow-ID) that should be processed, in part, by the microprocessor-data 520 are determined by configuring the flow table. The packet processor 510 uses this information to determine which packets should be duplicated and dispatched to microprocessor-data 520 for DPI processing. The flow table is typically kept in the internal memory of the packet processor 510. A firmware of the packet processor 510 is programmable to include multiple processing stages that may include, but are not limited to, parsing, classifying, filtering, encrypting, and routing/bridging of packets.

It should be noted that in certain embodiments incoming/outgoing packets regardless of whether they should be deep inspected or not should be processed without any additional delay by the packet processor 510 and microprocessor-data 520 as described in the '931 application referenced above.

The microprocessor-control 530 is operable in the control path and executes tasks that are typically related to management of connections handled by the PON processor 500 and to the control of the PON processor 500. The microprocessor-control 530 does not process individual packets belonging to a certain flow.

In accordance with an exemplary embodiment of the invention, the microprocessor-data 520 and microprocessor-control 530 are MIPS 74KEC RISC microprocessors. The microprocessor-control 530 is designed to perform time-consuming and complex processing tasks, thus it runs a complete operating system (e.g., Linux). In order to perform fast context switching and parallel processing the microprocessor-data 520 does not run an operating system.

The architecture of the embodiments depicted in FIG. 4 and FIG. 5 is of a PON processor. However, a person with ordinary skill in the art can easily adapt the teachings disclosed herein to implement a network processor for access networks other than PONs.

The various embodiments disclosed herein can be implemented as hardware, firmware, software or any combination thereof. Moreover, the software is preferably implemented as an application program tangibly embodied on a program storage unit, a non-transitory computer readable medium, or a non-transitory machine-readable storage medium that can be in a form of a digital circuit, an analogy circuit, a magnetic medium, or combination thereof. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

What is claimed is:

1. A method for deep-packet inspection (DPI) of packets received at an end-unit from among a plurality of end-units in a point-to-multipoint network, the plurality of end-units being coupled to a central unit, the method comprising:

classifying, by the end-unit, a packet received at the end-unit based on a flow-identification (ID) and a Media Access Control (MAC) address that the packet is received from to determine whether the packet should be deep-packet inspected;

duplicating in real-time at a traffic rate, by the end-unit, the packet and subsequent packets belonging to the flow-ID and the MAC address when the packet is determined to be deep-packet inspected;

saving, by a packet processor in the end-unit, the duplicated packet and the duplicated subsequent packets in a memory that is external to the end-unit;

transmitting, by the packet processor, the flow-ID and the MAC address, indexed to the memory, to a microprocessor in the end-unit;

upon collection of a predefined number of duplicated packets belonging to the flow-ID and the MAC address, retrieving by the microprocessor the predefined number of duplicated packets belonging to the flow-ID and the MAC address from the memory;

performing, by the end-unit, off-line deep-packet processing of the predefined number of duplicated packets based on a DPI application; and saving, by the end-unit, deep-packet processing results in the memory.

2. The method of claim 1, further comprising:
sending the deep-packet processing results to a database server that gathers deep-packet processing results from the plurality of end-units.

3. The method of claim 1, wherein the flow-ID is from among a plurality of flow-IDs, and further comprising:
saving flow-IDs from among the plurality of flow-IDs that require DPI in a flow table.

4. The method of claim 1, wherein the packet is not delayed by the DPI processing.

5. The method of claim 1, wherein the DPI application comprises:
eavesdropping to the predefined number of duplicated packets.

6. The method of claim 1, wherein the DPI application comprises:
detecting malicious attacks;
data mining;
network management services; or
censorship of the predefined number of duplicated packets.

7. The method of claim 6, wherein the off-line deep-packet processing further comprises:
processing the predefined number of duplicated packets in any one of a communication Layer 2 through Layer 7 of an open system interconnection model (OSI) model.

8. The method of claim 1, wherein the off-line deep-packet processing comprises:
processing a header or a payload portion of the predefined number of duplicated packets.

9. The method of claim 1, wherein the point-to-multipoint network is a passive optical network (PON), and
wherein the end-unit is an optical network unit (ONU) of the PON.

10. The method of claim 1, further comprising:
filtering in real-time at the traffic rate, by the end-unit, the packet and the subsequent packets when the packet is determined to be deep-packet inspected.

11. The method of claim 1, further comprising:
determining the packet received at the end-unit is to be deep-packet inspected when the flow-ID is designated as requiring the DPI and the MAC address corresponds to a computing device that is designated as requiring the DPI.

12. A processing system, integrated in an end-unit of a plurality of end-units of a point-to-multipoint network, to perform deep-packet inspection (DPI) of packets received at the end-unit, the plurality of end-units coupled to a central unit, the processing system comprising:
a packet processor configured to:
classify a packet received at the end-unit based on a flow-identification (ID) and a Media Access Control (MAC) address that the packet is received from to determine whether the packet should be deep-packet inspected,
duplicate in real-time at a traffic rate the packet and subsequent packets belonging to the flow-ID when the packet is determined to be deep-packet inspected; and
store the duplicated packet and the duplicated subsequent packets in a memory; and
a microprocessor configured to:
receive, from the packet processor, the flow-ID and the MAC address, indexed to the memory;
retrieve, upon collection of a predefined number of duplicated packets belonging to the flow-ID and the MAC address, the predefined number of duplicated packets belonging to the flow-ID and the MAC address from the memory; and
perform, off-line deep-packet processing of the predefined number of duplicated packets based on a DPI application.

13. The processing system of claim 12, further comprising:
a memory controller configured to allow the packet processor or the microprocessor to access the memory, wherein the memory is an external memory.

14. The processing system of claim 13, wherein the packet processor is further configured to save the duplicated packet and the duplicated subsequent packets in the external memory.

15. The processing system of claim 14, wherein the microprocessor is further configured to:
perform the off-line deep-packet processing on the saved duplicated packet and the saved duplicated subsequent packets, and
save deep-packet processing results in the external memory.

16. The processing system of claim 14, wherein the packet processor is further configured to send deep-packet processing results to a database server that gathers deep-packet processing results for the plurality of end-units.

17. The processing system of claim 12, wherein the flow-ID is from among a plurality of flow-IDs, and:
wherein flow-IDs from among the plurality of flow-IDs that require DPI are saved in a flow table maintained by the packet processor.

18. The processing system of claim 12, wherein the DPI application comprises:
eavesdropping to the predefined number of duplicated packets;
detecting of malicious attacks;
data mining;
network management services; or
censorship of the predefined number of duplicated packets.

19. The processing system of claim 12, wherein the DPI application comprises:
executable code programmed in a high-level programming language,
wherein the executable code is updated on-site to perform a modified DPI application, and wherein the executable code is stored in a non-transitory computer readable medium accessed by the microprocessor.

20. The processing system of claim 12, wherein the microprocessor is configured to process a header or a payload portion of the predefined number of duplicated packets,
wherein microprocessor is configured to process the predefined number of duplicated packets in any one of a communication Layer 2 through Layer 7 of an open system interconnection model (OSI) model.

21. The processing system of claim 12, further comprising:
a second microprocessor configured to manage connections handled by the processing system;
a data-path bus configured to connect the packet processor and the microprocessor; and
a control-path bus configured to connect the packet processor and the second microprocessor.

22. The processing system of claim 21, further comprising:
a Ethernet MAC adapter configured to interface with a plurality of subscriber devices; and
a passive optical network (PON) MAC adapter configured to process traffic according to a Gigabit PON (GPON), a Broadband PON (BPON), or an Ethernet PON (EPON).

23. The processing system of claim 12, wherein the processing system is implemented within an optical network unit (ONU) of a passive optical network (PON).

24. The processing system of claim 12, wherein the end-unit comprises:
an optical network unit (ONU), and
wherein the central unit comprises:
an optical line terminal (OLT).

25. The processing system of claim 12, wherein the packet processor is further configured to determine the packet received at the end-unit is to be deep-packet inspected when the flow-ID is designated as requiring the DPI and the MAC address corresponds to a computing device that is designated as requiring the DPI.

* * * * *

UNITED STATES PATENT AND TRADEMARK OFFICE
CERTIFICATE OF CORRECTION

PATENT NO. : 9,565,120 B2  
APPLICATION NO. : 13/361169  
DATED : February 7, 2017  
INVENTOR(S) : Levy et al.

It is certified that error appears in the above-identified patent and that said Letters Patent is hereby corrected as shown below:

In the Claims

In Column 11, Line 8, "wherein microprocessor" is replaced with --wherein the microprocessor--.

Signed and Sealed this  
Twentieth Day of March, 2018

Andrei Iancu  
*Director of the United States Patent and Trademark Office*